United States Patent [19]
Roberts et al.

[11] Patent Number: 5,960,167
[45] Date of Patent: Sep. 28, 1999

[54] PRINTER CONFIGURATION SYSTEM

[75] Inventors: John T. Roberts, Pittsford; Lawrence W. Meyer, Fairport; Michael H. Wang, Macedon; Peter J. Zehler, Penfield, all of N.Y.

[73] Assignee: Xerox Corporation, Stamford, Conn.

[21] Appl. No.: 08/984,746

[22] Filed: Dec. 4, 1997

Related U.S. Application Data

[60] Provisional application No. 60/041,448, Mar. 24, 1997.

[51] Int. Cl.⁶ .............................. G06F 3/12; G06F 13/00
[52] U.S. Cl. .................................. 395/114; 710/8; 710/16
[58] Field of Search .................................... 395/114, 113; 710/8, 15, 16

[56] References Cited

U.S. PATENT DOCUMENTS

| | | | |
|---|---|---|---|
| 5,113,494 | 5/1992 | Menendez et al. | 345/502 |
| 5,220,674 | 6/1993 | Morgan et al. | 395/200.53 |
| 5,450,571 | 9/1995 | Rosekrans et al. | 395/500 |
| 5,483,653 | 1/1996 | Furman | 395/500 |
| 5,613,160 | 3/1997 | Kraslavsky et al. | 395/836 |
| 5,692,111 | 11/1997 | Marbry et al. | 395/114 |

*Primary Examiner*—Scott Rogers
*Attorney, Agent, or Firm*—Gary B. Cohen

[57] ABSTRACT

A method for automatically configuring a printer in a network is provided. In practice, an unconfigured printer is communicatively coupled to the network and begins transmitting an advertising protocol. In turn, an entry, varying as a function of the advertising protocol is entered into a table. In response to reading the entry, an auto install program creates a set of print related objects and stores them for use with a print service manager. By reference to the objects, the print service manager communicates information to a broker for indicating to a set of network users that print operations can be performed with the previously unconfigured printer.

9 Claims, 5 Drawing Sheets

PRINTER CONFIGURATION SYSTEM

Priority is claimed to Provisional Application No. 60/041,448 filed Mar. 24, 1997.

BACKGROUND

This invention relates generally to a printing system in which print related devices are communicatively coupled to a network and, more particularly, to an automatic printer installation routine in which an unconfigured printer is communicatively coupled to the network and auto installation software facilitates the automatic installation of the unconfigured printer in such a manner that a selected group of client workstations communicating with the network can access the configured printer for use thereof.

The area of distributed printing across local or wide area networks is growing at a rapid pace. Companies such as Novell provide services, e.g. a network operating system, which permit multiple clients to communicate with multiple document processing devices, e.g. printers, by way of a suitable print server. U.S. Pat. No. 5,220,674 to Morgan et al. (Issued Jun. 15, 1993) discloses a print server capable of coordinating operation between multiple clients and multiple printers. In the arrangement of the '674 patent, communicatively coupling the clients with the printers is relatively easy because all of the printers are "linked" to the server by way of a single driver. Essentially, all of the printers are "on the same page" with respect to the server in that they are exploiting a common protocol and the server has explicit knowledge of the location of each printer.

In various distributed printing systems, communication between the printers and the server becomes far more problematic since a printer may be coupled with a node of which a host server is unaware. U.S. Pat. No. 5,113,494 to Menendez (Issued: May 12, 1992) discloses a system in which various document processing subsystems communicate with one another by way of a local area network. U.S. Pat. No. 5,450,571 to Rosekrans et al. (Issued: Sep. 12, 1995) also contemplates a network printing system in which multiple clients and document processing devices communicate with one another by way of a LAN. As taught by U.S. Pat. No. 5,483,653 to Furman (Issued: Jan. 9, 1996), use of the above-mentioned Novell operating system is well suited for use in the printing arrangement of the '571 patent.

In current practice, when a printer is "plugged into" a network, a protocol "advertisement" is transmitted onto the network for letting a corresponding server know that the printer seeks to be set up or registered. Without such registration, none of the clients on the network can know of the printer's existence. In one common approach, registration is achieved with a system administrator ("SA") accessing one or more servers corresponding with the unregistered printer and using suitable software for detecting the advertisement or signal of the transmitting printer. In response to detecting the signal, the unregistered printer is then registered manually so that clients having an operating system compatible with the new printer are now able to use it.

This approach of registering a printer on a network is well suited for its intended purpose provided a SA is available to detect the new printer's advertisement and register the new printer accordingly. Clearly, it would be desirable to provide an approach in which a SA is not required to be available each time a new printer requires registration on the network. In a current Novell scheme referred to as "Novell Distributed Print Service" or "NDPS" ("Novell Distributed Print Service" is a trademark of Novell used in conjunction with Netware ("Netware" is a trademark of Novell) adaptable software), a given operating system can be apprised of the existence of a printer on the network provided a "Service Registry Service" or "SRS" (a component of NDPS) is apprised of certain objects associated with the printer. It would be desirable to provide an approach in which the SRS is automatically apprised of the certain objects each time a new printer is communicatively coupled with a network.

The present invention employs network capability to achieve various advantageous ends. The following discussion is intended to provide a background for any appropriate network implementation required by the embodiment(s) described below:

Examples of some recent patents relating to network environments of plural remote terminal shared users of networked printers include Xerox Corporation U.S. Pat. Nos. 5,243,518, 5,226,112, 5,170,340 and 5,287,194. Some patents on this subject by others include U.S. Pat. Nos. 5,113,355, 5,113,494 (originally filed Feb. 27, 1987), 5,181,162, 5,220,674, 5,247,670; 4,953,080 and 4,821,107. Further, by way of background, some of the following Xerox Corporation U.S. patents also include examples of networked systems with printers: U.S. Pat. Nos. 5,153,577; 5,113,517; 5,072,412; 5,065,347; 5,008,853; 4,947,345; 4,939,507; 4,937,036; 4,920,481; 4,914,586; 4,899,136; 4,453,128; 4,063,220; 4,099,024; 3,958,088; 3,920,895; and 3,597,071. Also noted are IBM Corp. U.S. Pat. Nos. 4,651,278 and 4,623,244, and Canon U.S. Pat. No. 4,760,458 and Jap. Pub. No. 59-63872 published Nov. 4, 1984. Some of these various above patents also disclose multi-functional or integral machines [digital scanner/facsimile/printer/copiers] and their controls.

Some other network system related publications include "Xerox Office Systems Technology" ". . . Xerox 8000 Series Products: Workstations, Services, Ethernet, and Software Development" ©1982, 1984 by Xerox Corporation, OSD-R8203A, Ed. T. Linden and E. Harslem, with a "Table of Contents" citing its numerous prior publications sources, and an Abstract noting the April, 1981 announcement of "the 8110 Star Information System, A New Personal Computer . . . "; "Xerox System Integration Standard Printing Protocol XSIS 118404", April 1984; "Xerox Integrated Production Publishers Solutions: Booklet No. 610P50807 (11/85); "Printing Protocol-Xerox System Integration Standard" ©1990 by Xerox Corporation, XNSS 119005 May 1990; "Xerox Network Systems Architecture", "General Information Manual", XNSG 068504 April 1985, with an extensive annotated bibliography, ©1985 by Xerox Corporation; "Interpress: The Source Book", Simon & Schuster, Inc., New York, N.Y., 1988, by Harrington, S. J. and Buckley, R. R.; Adobe Systems Incorporated "PostScript® Language Reference Manual", Addison-Wesley Co., 1990; "Mastering Novell® Netware®", 1990, SYBEX, Inc., Alameda, Calif., by Cheryl E. Currid and Craig A. Gillett; "Palladium Print System" ©MIT 1984, et sec; "Athena85 Computing in Higher Education: The Athena Experience", E. Balkovich, et al, Communications of the ACM, 28(11) pp. 1214–1224, November, 1985; and "Apollo87 The Network Computing Architecture and System: An Environment for Developing Distributed Applications", T. H. Dineen, et al, Usenix Conference Proceedings, June 1987.

Noted regarding commercial network systems with printers and software therefor is the 1992 Xerox® Corporation "Network Publisher" version of the 1990 "DocuTech®" publishing system, including the "Network Server" to customer's Novell® 3.11 networks, supporting various different network protocols and "Ethernet"; and the Interpress Electronic Printing Standard, Version 3.0, Xerox System Integration Standard XNSS 048601 (Jan. 1986). Also, the much earlier Xerox® Corporation "9700 Electronic printing System"; the "VP Local Laser Printing" software application package, which, together with the Xerox® "4045" or other Laser Copier/Printer, the "6085 Professional Computer System" using Xerox Corporation "ViewPoint" or "GlobalView®" software and a "local printer [print service] Option" kit, comprises the "Documenter" system. The even earlier Xerox® Corporation "8000" "Xerox Network Services Product Descriptions" further describe other earlier Xerox® Corporation electronic document printing systems. Eastman Kodak "LionHeart®" systems, first announced Sep. 13, 1990, are also noted.

Current popular commercial published "systems software" including LAN workstation connections includes Novell® DOS 7.0, "Windows®" NT 3.1, and IBM OS/2 Version 2.1.

Disclosures of all of the patents cited and/or discussed above in this Background are incorporated herein by reference.

SUMMARY OF THE INVENTION

In accordance with the present invention, there is disclosed a method for use with a printing system including a client and a set of one or more print related devices, both of the client and the set of one or more print related devices being communicatively coupled with a network. Each of the one or more print related devices employs an advertising protocol to communicate with the client and each of the one or more print related devices is registered with a registry service, the registry service storing configuration information regarding each of the one or more print related devices. Through use of the advertising protocol and the stored configuration information the client is provided with the capability to communicate with each print related device for the sake of transferring print related information therebetween. The method comprises: a) communicatively coupling an unconfigured print related device, which employs the advertising protocol, to the network such that the unconfigured print related device transmits the advertising protocol indicating that the unconfigured print related device is to be configured; b) writing a first set of information, which varies as a function of the advertising protocol, to a first memory location; c) reading the first set of information from the first memory location with an installation utility; d) in response to said reading and meeting a preselected condition, creating a second set of information for the unconfigured print related device and writing the second set of information to a second memory location; and e) processing the second set of information so that configuration information regarding the unconfigured print related device is provided to the registry service and the unconfigured print related device is configured for transferring print related information with the client.

DESCRIPTION OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
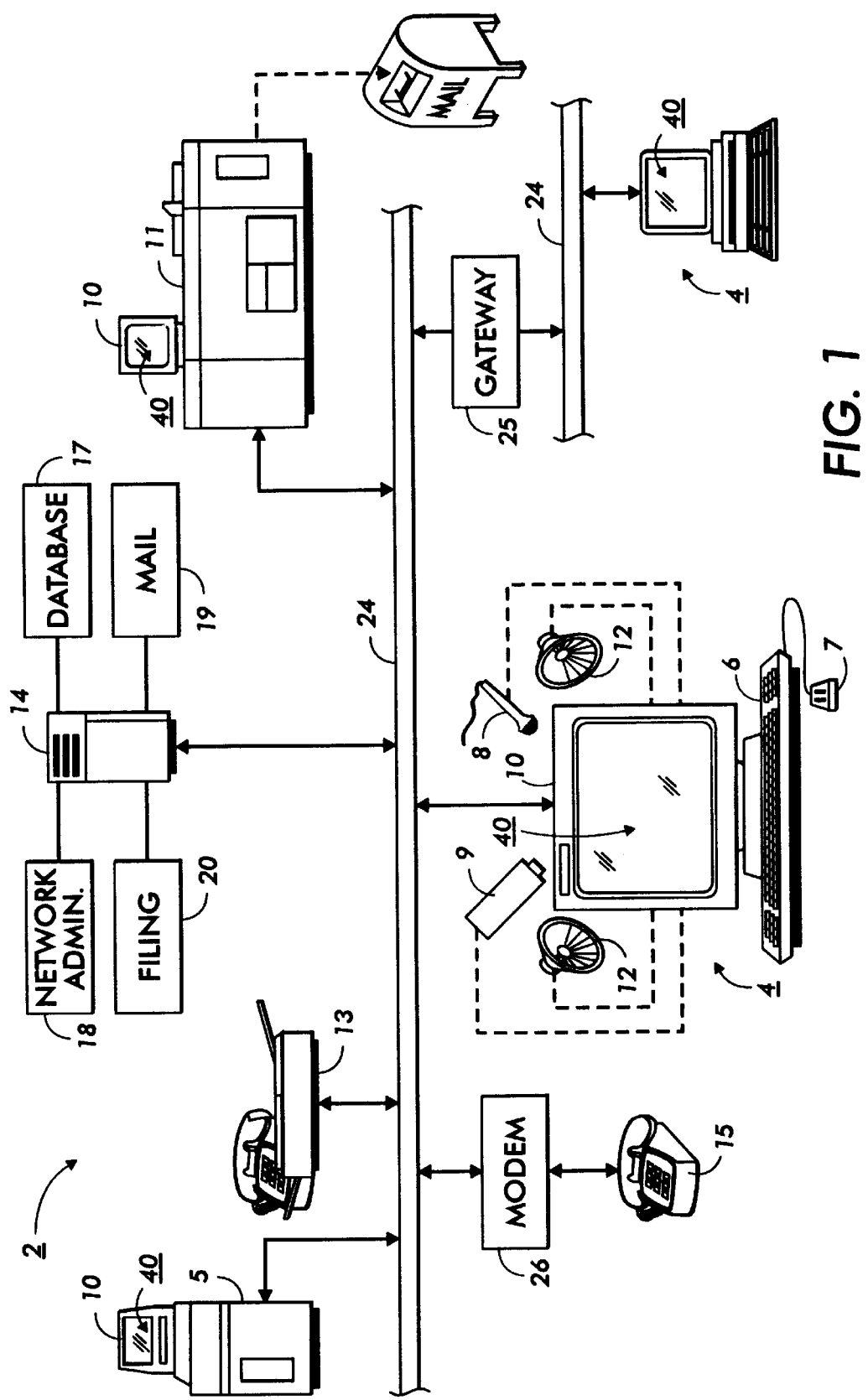
FIG. 1 is a schematic illustration of a system environment incorporating the present invention.

Referring now to the drawings and in particular to FIG. 1, an exemplary multimedia device information system or network 2 including work station 4 enables users to communicate in a transparent and device independent manner. Multimedia system 2 can be implemented using a variety of hardware platforms and includes devices for input including scanner or Digital Copier 5, keyboard 6, pointing device or mouse 7, microphone 8, and video camera 9. The system further has devices for output including display terminal 10, printer 11, and speakers 12. Input/output (I/O) devices include facsimile 13, file server 14, and telephone 15. Server 14 is configured central to or remote from work station 4 with public, shared and/or private data storage that is differentiated by user access rights. The server 14 includes relational database system 17, network administration system 18, mail system 19 (e.g. email, voice mail) and data storage and retrieval system 20, and can be physically configured using optical drives, hard drives, floppy drives and/or tape drives. The relational database system 17 provides systems with fast query and retrieval of data.

Workstation 4 operates in a collaborative environment, where users at different workstations 4 can work together in real time to process and distribute public, shared or private information existing in different forms. (Public data is defined herein as data accessible by anyone, shared data is defined as data accessible by a limited number of users and private data is data uniquely accessible by a single user.) Work station 4 can exist in a distributed or centralized environment. In either environment, workstation 4 is connected to other systems and devices through local area network (LAN) 24, gateway 25, and/or modem 26. In distributed systems, a number of Work stations extend distributed processing and storage capabilities to each other, by providing, for example, redundant storage or a single mounting of a unique application. Workstation 4 includes an object oriented user interface (UI) 40 that uses icons and windows to represent various data objects and user applications such as a display illustrating an office desktop metaphor employing various abstractions of a typical office environment. User interfaces using windows and icons having an object oriented methodology to present metaphors for maintaining data, navigating through various user spaces and presenting abstract computer concepts are well known, an example of which is Globalview ("Globalview" is a trademark used by Xerox Corp. in conjunction with software for an operating system), which uses abstractions such as a desktop, inbasket, outbasket and documents.

Figure 2:
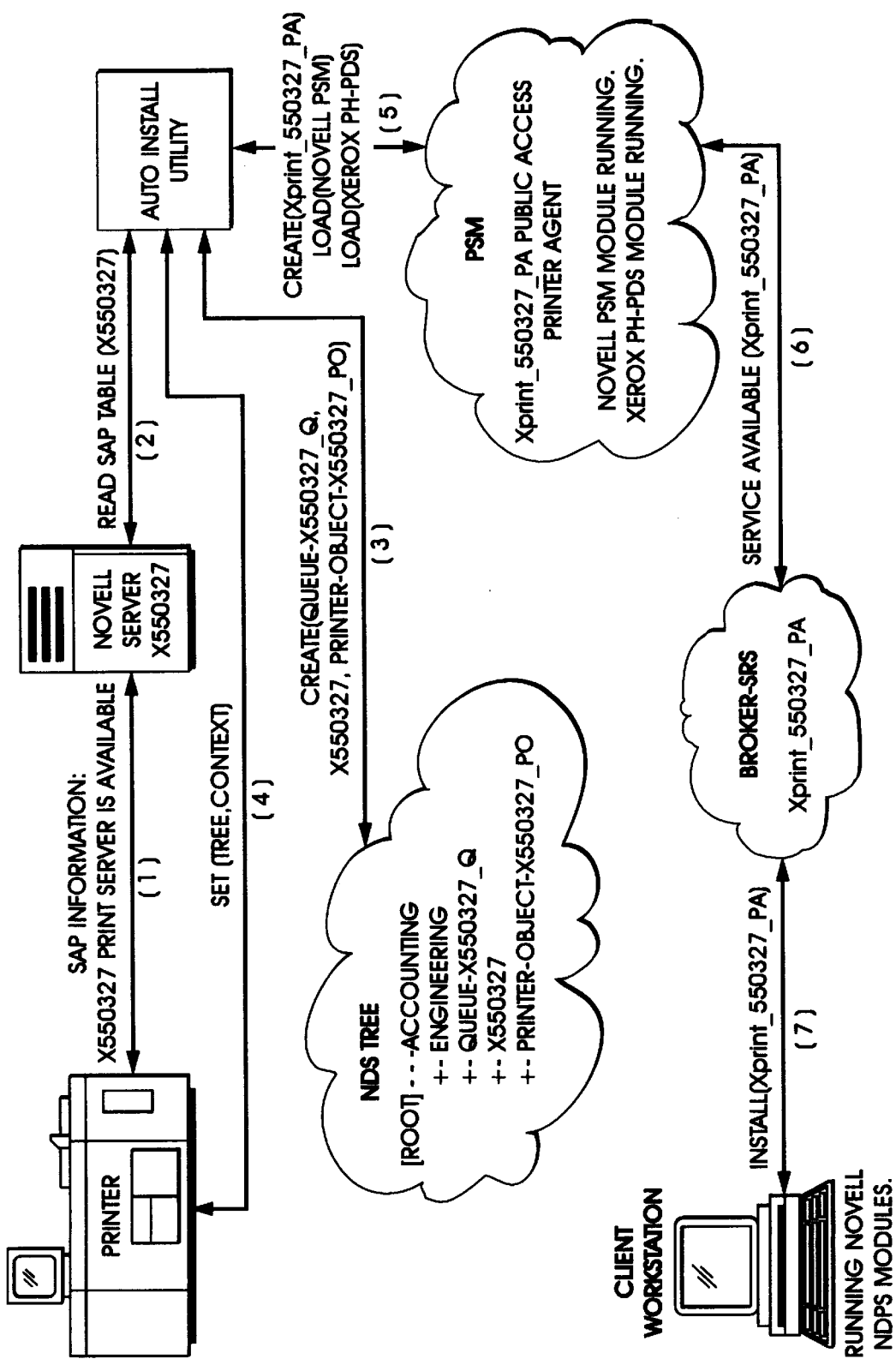
FIG. 2 is a schematic illustration demonstrating a data flow of an automatic configuration routine embodying the present invention.

Referring to FIG. 2, a data flow diagram for a print related device configuration system is shown. It will be appreciated that while the print related device is shown as a printer, the approach of the data flow diagram is appropriate for use with a full range of print or document processing related devices capable of transmitting an advertising protocol. As illustrated, the data flow is labeled with numerals which will be employed in the following discussion:

(1) Initially, in the illustrated example of FIG. 2, a printer is connected to a network (or a "web" of networks) and powered on. Preferably, the printer includes an interface card which permits the printer to broadcast a service advertising protocol ("SAP") over the network. Alternatively, a previously installed printer could be reset and allowed to broadcast over the network for purposes of employing the "plug and print" scheme described herein. As contemplated, one or more Novell Netware ("Netware" is a trademark used by Novell in conjunction with a network operating system) servers record the SAP information in a bindery SAP table.

(2) As a result of monitoring the bindery SAP table, an auto install utility, the details of which will be described further below, discovers the SAP entry in the table. The auto install utility can operate on every server having a broker or service registry service (see below for discussion of "SRS"), on selected servers with brokers or on clients with administrative privileges. It should be recognized that an unconfigured printer is defined as a printer which is not currently set up to service print jobs.

(3) A fully functional print system is created for the printer in a Novell directory service ("NDS") or a bindery. That is, the auto install utility creates NDS objects which represent the new printer in a directory tree. In the case of Xprintplus ("Xprintplus" is a trademark of Xerox Corp. used in conjunction with network printing systems) three objects are created for each printer, namely an object for a queue (e.g. "<SAP-ID>_Q"), an object for a print server (e.g. "<SAP-ID_PS"). and a printer object (e.g. "<SAP-ID>_PO"). The queue preferably has a print service manager ("PSM") object as a queue user, thus permitting a print design subsystem/port handler ("PDS-PH") to submit jobs.

(4) The auto install utility configures the printer. That is, any internal values required by the printer are set by the utility. In the case of Xprintplus, such parameters as context, pserver name and tree are set to appropriate values. As shown in FIG. 2, configuration is facilitated through use of a function call including the argument "(Tree, Context)".

(5) The auto install utility creates Novell Distributed Print Service ("NDPS" is abbreviation used by Novell in referring to a network printing control package) objects in the PSM. In particular, if a PSM exists, a new printer agent (e.g. "XPRINT_<SAP-ID_PA") will be added. It should appear that an "agent" functions cooperatively with the Novell service referred to as the SRS for making information regarding components on a Netware based network system available to clients accessing such system. If a PSM does not exist, then the same will be created in conjunction with a printer agent. The generated printer agent serves as both the agent seen by a client as well as the destination to which jobs are submitted. Preferably, the agent is populated with PDS exec and PH exec OID values. In practice, the printer agent is "downed" and brought back up. Upon bringing the printer agent up, the PDS and PH are functional. Additionally, the driver of the printer is set in the printer agent and automatic download of drivers is enabled.

(6) When the printer agent is brought back up, the PSM adds the XPRINT_<SAP-ID>_PA printer agent to the SRS since the printer agent has no NDPS printer object association. As shown in FIG. 2, the PSM communicates to the SRS that a printer service is available for use by those having access to the network with which the printer communicates.

(7) In view of (1)–(6) above, any client workstation running Novell NDPS modules can print to Xprint_550327_PA. Alternatively, a client in the NDS tree can see queue X550327_Q and print to the queue whether it is running Novell NDPS modules or not.

Figure 3:
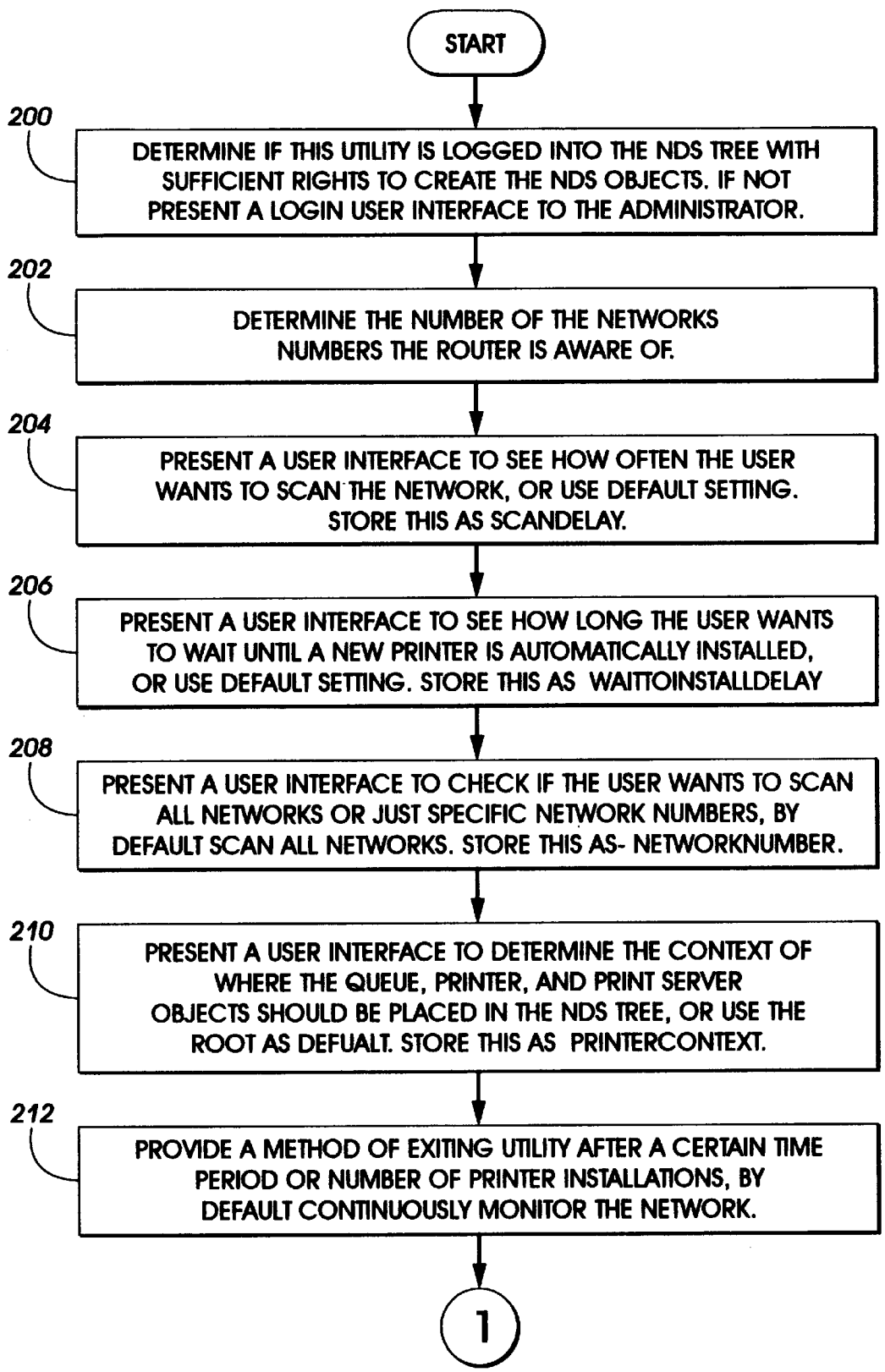
FIG. 3 is a flow diagram illustrating an initialization routine for an auto install utility.
Figure 4:
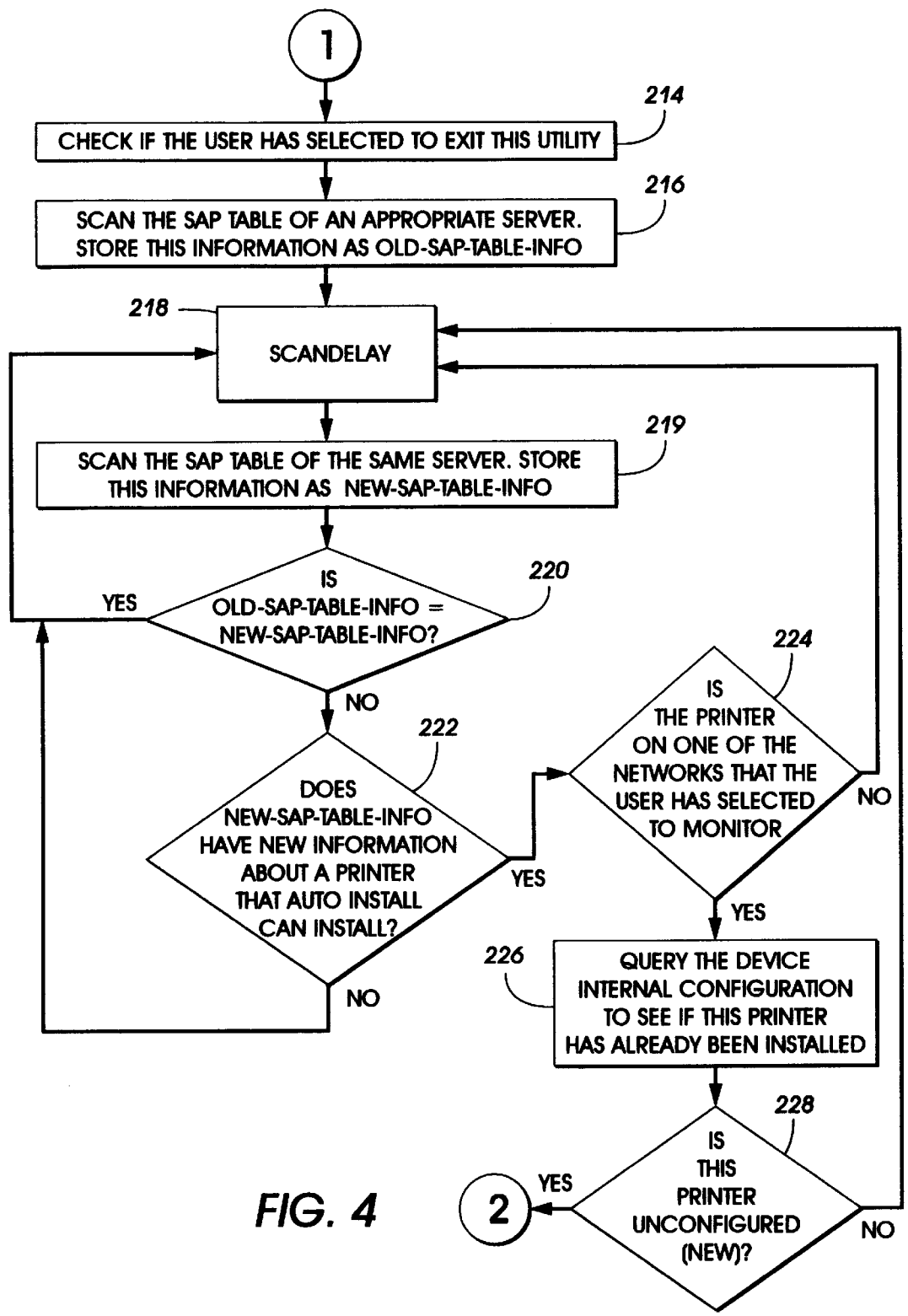
FIG. 4 is a flow diagram illustrating how the auto install utility determines whether a printer requires installing.
Figure 5:
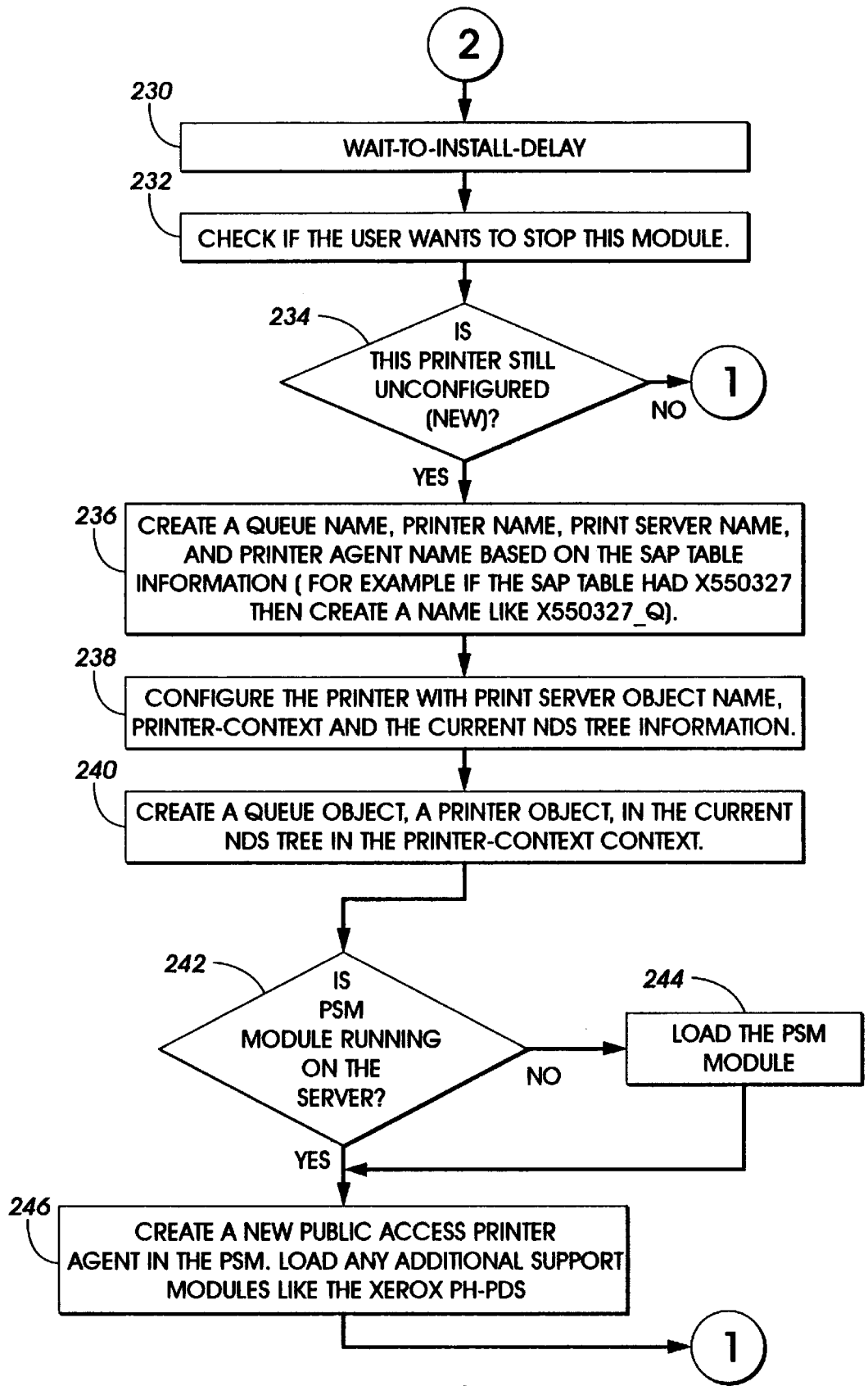
FIG. 5 is a flow diagram illustrating the manner in which a printer is automatically installed through aid of the auto install utility.

Referring now to FIGS. 3–5, operation of the auto install utility, in the environment described by way of the data flow diagram of FIG. 2, is described. Referring specifically to FIG. 3, an initialization routine includes a step for determining that the utility is suitably logged into the NDS tree (step 200) and has sufficient rights to create NDS objects. It will be recognized that a user interface appropriate for performing the actions shown in FIGS. 3–5 can be achieved with a conventional graphic user interface (gui) system, such as the gui shown in U.S. Pat. Nos. 5,077,795 or 5,513,126. At step 202, a determination as to the real extent of the pertinent networks (also referred to herein as "web") is made and the number of times that the user desires to scan the web for unconfigured devices ("ScanDelay") is set at step 204.

In the illustrated embodiment, the user is provided with an opportunity to configure a device at a time later than when it is actually connected to the web (step 206) by way of a value "ScanDelay" and an opportunity (at step 208) to scan less than all of the web. It will be appreciated that, under certain circumstances, the user may not wish to configure all devices or printers on the web, but only those devices or printers having a selected proximity with respect to the user. At step 210, the user is provided with a degree of control with respect to placement of objects in the NDS tree and, at step 212, the user is permitted to optimize memory usage by setting the time at which the utility is to be exited.

Referring specifically to FIG. 4, upon initializing the utility, the system may abort in response to a check at step 214. Assuming that auto-configuration is desired, the SAP table (FIG. 2) of each selected server on the web is scanned (step 216) and appropriate information therefrom is stored. After undergoing a preset ScanDelay (step 218) the SAP tables of the selected servers are scanned (step 219) to determine, at step 220, if new SAP information has been obtained. When the table includes new information, a check is made at step 222 to ascertain if the new SAP information is of the type that would prompt automatic configuration of a newly connected device. In some instances, the new SAP information will not be related to automatic configuration and the process will return to step 218.

If the new SAP information prompts automatic configuration, then the process proceeds to step 224 where the desirability of the configurable device is considered. In one example, the user may decide that the device or printer is simply too far away from a selected region to be effective or worthwhile. In some instances, the device will be not be optimally located and the process will return to step 218. On the other hand, if the device is within a desired portion of the web, then the internal configuration of the device indicated by the SAP information will be queried (step 226) to determine whether the printer has already been installed. If the device or printer has already been configured, then the process returns to step 218, otherwise, the process proceeds to the configuration routine of FIG. 5 through step 228.

Referring to FIG. 5, a delay (WaitToInstallDelay) is provided at step 230 and a check is performed (step 232) to determine if the utility is to be stopped. Assuming that the module continues to run and the printer still requires configuring (see step 234), various steps, the significance of which should appear from the description above, are performed at steps 236, 238 and 240. If the PSM is not running on the server (see step 242),P then the PSM is loaded via step 244; otherwise, a new public access printer agent is created in the PSM and any additional support modules (e.g. PH-PDS) are loaded.

Numerous features of the above-described embodiment will be appreciated by those skilled in the art.

First, the preferred routine permits an unconfigured printer to be automatically configured thus minimizing the amount of human intervention in the printer configuration process. In particular, provided a broker or service registry exists on a network, the preferred routine allows automatic configuration through communication of selected objects to the registry service. In the preferred routine, an auto install utility reads a table entry, which varies as a function of advertising protocol information, and creates the selected objects for placement in a tree directory. Eventually, the objects are communicated with the registry service through use of a program service manager.

Second, the auto install utility facilitates the configuration process in multiple respects. In one aspect of the preferred embodiment, the advertising protocol information, which provides the basis for creating the selected objects, is discovered by the auto install utility. In another aspect of the preferred embodiment, the auto install utility configures the uninstalled printer.

Finally, the disclosed system permits a user to constrain the extent to which an unconfigured printer is "seen" by a given set of servers on a plurality of networks. In particular, less than all of the plurality of networks may be scanned to find an unconfigured printer. Alternatively, when an unconfigured printer is discovered a determination can be made as to whether the unconfigured printer is within an acceptable proximity of one or more selected servers prior to configuring the printer. By considering the location of the printer prior to automatic configuration, the user can avoid configuring a printer which may be undesirably located relative to the one or more selected servers or users.

What is claimed is:

1. A method for use with a printing system including a client and a set of one or more print related devices both of the client and the set of one or more print related devices being communicatively coupled with network, each of the one or more print related devices employing an advertising protocol to communicate with the client and each of the one or more print related devices being registered with a registry service, the registry service storing configuration information regarding each of the one or more print related devices, wherein, through use of the advertising protocol and the stored configuration information the client is provided with the capability to communicate with each print related device for the sake of transferring print related information therebetween, comprising:
   a) communicatively coupling an unconfigured print related device, which employs the advertising protocol, to the network;
   b) transmitting the advertising protocol to the network from the unconfigured print related device for indicating that the unconfigured print related device is to be configured;
   c) writing a first set of information, which varies as a function of the advertising protocol, to a first memory location;
   d) reading the first set of information from the first memory location with an installation utility;
   e) in response to said reading of (d), creating a second set of information for the unconfigured print related device and writing the second set of information to a second memory location, wherein said (e) comprises creating objects, representative of the unconfigured print related device, and writing copies of the created objects into the second memory location; and
   f) processing the second set of information, including the created objects, for providing configuration information regarding the unconfigured print related device to the registry service, the unconfigured print related device being configured with the configuration information to transfer print related information with the client.

2. The method of claim 1, wherein said b) comprises recording service advertising protocol information in one or more bindery tables, each of the one or more bindery tables being disposed in a print server communicating with the network.

3. The method of claim 2, wherein said c) comprises discovering the service advertising protocol information with the installation utility automatically.

4. The method of claim 1, wherein said e) includes creating a plurality of objects in a print service manager and populating the registry service by reference to the plurality of objects.

5. The method of claim 1, further comprising configuring the unconfigured print related device with the installation utility.

6. The method of claim 1, wherein said a) comprises communicatively coupling a printing device to the network.

7. The method of claim 1, further comprising delaying execution of said d) a preselected time period after said reading of said c).

8. A method for use with a printing system including a client and a set of one or more print related devices, both of the client and the set of one or more print related devices being communicatively coupled with a network, the printing system further including multiple network portions, each of the one or more print related devices employing an advertising protocol to communicate with the client and each of the one or more print related devices being registered with a registry service, the registry service storing configuration information regarding each of the one or more print related devices, wherein, through use of the advertising protocol and the stored configuration information the client is provided with the capability to communicate with each print related device for the sake of transferring print related information therebetween, comprising:
   a) communicatively coupling an unconfigured print related device, which employs the advertising protocol, to the network such that the unconfigured print related device transmits the advertising protocol indicating that the unconfigured print related device is to be configured;
   b) writing a first set of information, which varies as a function of the advertising protocol, to a first memory location;
   c) reading the first set of information from the first memory location with an installation utility;
   d) in response to said reading, creating a second set of information for the unconfigured print related device and writing the second set of information to a second memory location;
   e) processing the second set of information so that configuration information regarding the unconfigured print related device is provided to the registry service and the unconfigured print related device is configured for transferring print related information with the client, wherein said scanning includes scanning less than all of the multiple network portions; and
   f) scanning the network periodically to determine if an unconfigured print related device is transmitting the advertising protocol, wherein said scanning includes scanning less than all of the multiple network portions.

9. A method for use with a printing system including a client and a set of one or more print related devices, both of the client and the set of one or more print related devices being communicatively coupled with a network, the network being defined by a plurality of network subsystems, each of the one or more print related devices employing an advertising protocol to communicate with the client and each of the one or more print related devices being registered with a registry service, the registry service storing configuration information regarding each of the one or more print related devices, wherein, through use of the advertising protocol and the stored configuration information the client is provided with the capability to communicate with each print related device for the sake of transferring print related information therebetween, comprising:

a) communicatively coupling an unconfigured print related device, which employs the advertising protocol, to the network such that the unconfigured print related device transmits the advertising protocol indicating that the unconfigured print related device is to be configured;

b) writing a first set of information, which varies as a function of the advertising protocol, to a first memory location;

c) reading the first set of information from the first memory location with an installation utility;

d) in response to said reading and meeting a preselected condition, creating a second set of information for the unconfigured print related device and writing the second set of information to a second memory location, wherein said d) includes finding that the preselected condition has been met when it is determined that the unconfigured print related device is within at least one of the plurality of network subsystems; and e) processing the second set of information so that configuration information regarding the unconfigured print related device is provided to the registry service and the unconfigured print related device is configured for transferring print related information with the client.

* * * * *